Jan. 4, 1927.
J. J. KOGER
1,613,462
DRAFT CONNECTION FOR PLOWS, ETC
Filed April 30, 1924    2 Sheets-Sheet 1
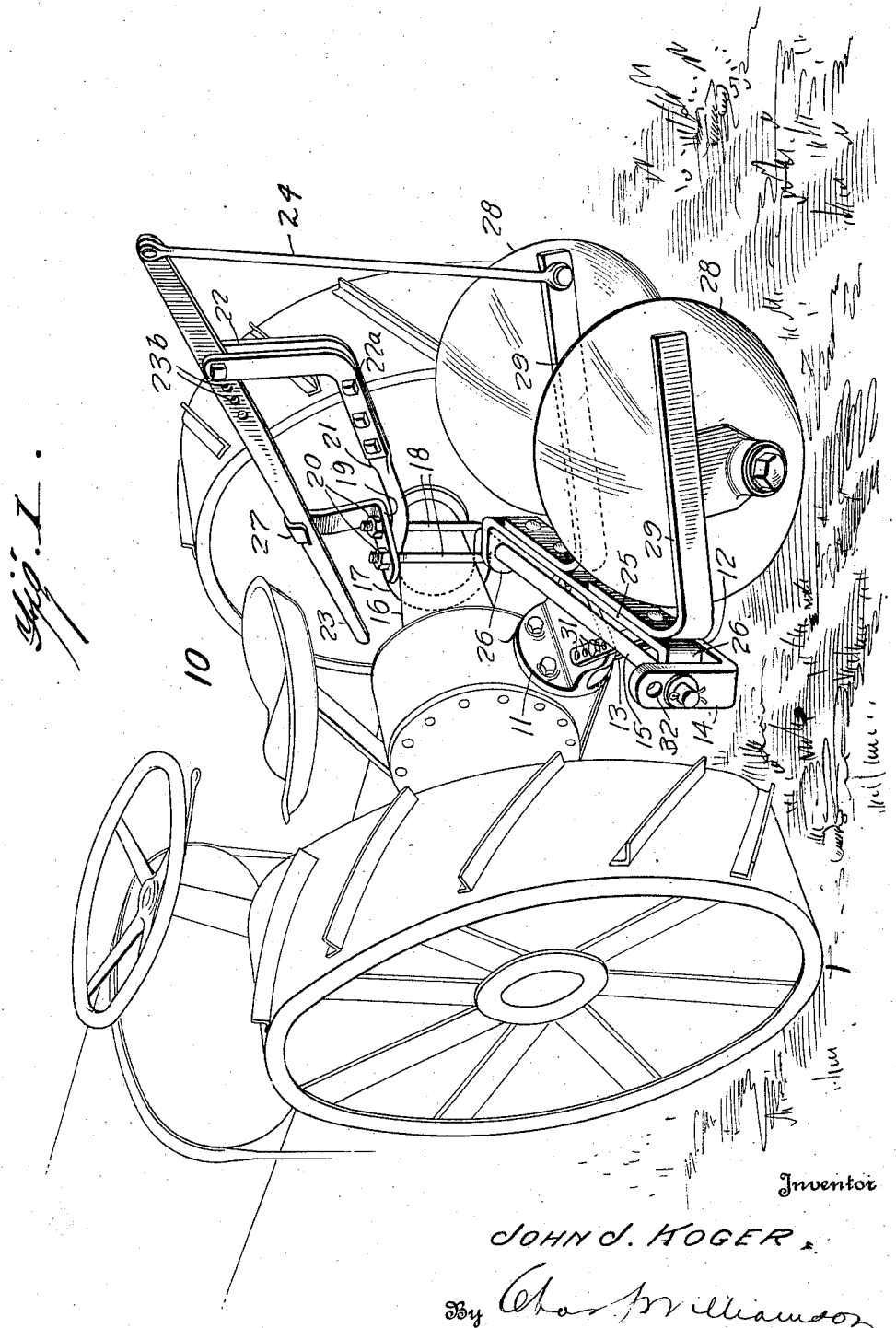
Inventor
JOHN J. KOGER,
By Chas. J. Williamson
Attorney

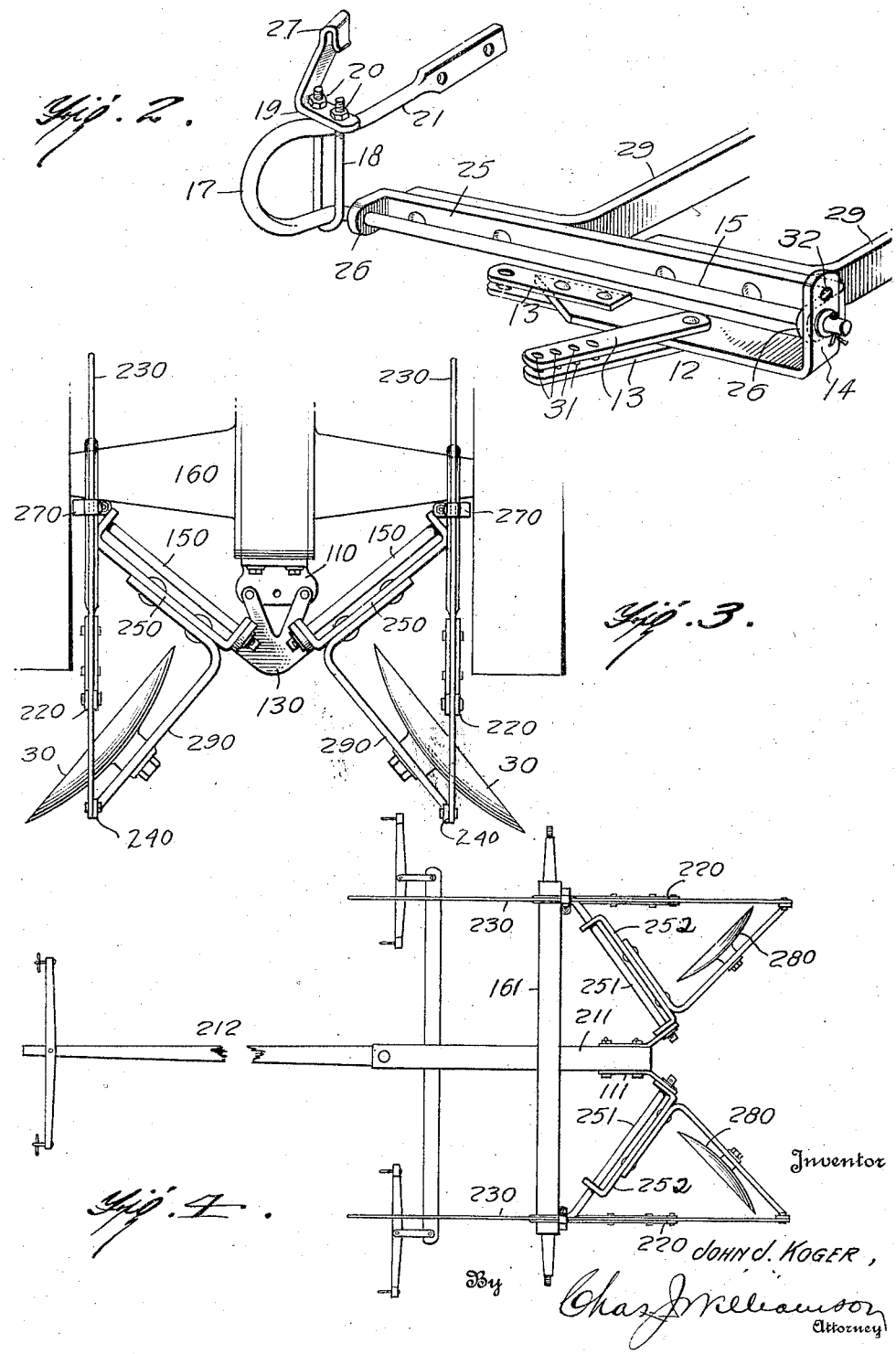

Patented Jan. 4, 1927.

1,613,462

UNITED STATES PATENT OFFICE.

JOHN J. KOGER, OF ROGERSVILLE, TENNESSEE.

DRAFT CONNECTION FOR PLOWS, ETC.

Application filed April 30, 1924. Serial No. 710,062.

My invention relates to agricultural implements and more particularly concerns the draft connection between the tractor and the implements, with the object in view, in what I now consider the most satisfactory embodiment of my invention of causing the work that is to be done, to be done in the most efficient and otherwise satisfactory manner from the standpoint of the quality of the work itself, consumption of fuel, comfort and convenience of the operator and securing simplicity and strength of structure, thus securing reduction of first cost and cost of maintenance. My invention besides achieving the objects stated results in other advantages which will be evident to those skilled in the art when that embodiment therefor shown in the drawings and hereinafter described is understood. My invention consists in whatever is described by or is included within the terms or scope of the appended claims.

In the accompanying drawings:

Fig. 1 is a perspective view of a portion of a tractor to which is applied one embodiment of my invention;

Fig. 2 is a perspective view of my hitch, draft or unit connection alone;

Fig. 3 is a top plan view illustrating another embodiment of my invention;

Fig. 4 is a top plan view of the embodiment of my invention where the draft power may be furnished by horses.

Briefly described my invention shown in Figs. 1 to 3 comprises a hitch or unit connection which, besides means for connection with the clevis plate or draw bar usually provided at the transverse center of the rear axle housing, has means for connection with the rear axle housing adjacent the end thereof and which includes a rod or shaft that extends obliquely from the point of connection with the axle end, rearwardly and inwardly and which provides means for pivotally supporting the implement carrying bar or frame so that the implement may be lowered and raised into and out of ground engaging position. And in the case shown in the drawings the implement is a disc-type plow, two forms of which are shown in the drawings, one being a pair of parallel discs supported by the same rocking bar or frame and the other a single disc plow situated at each side of the transverse center of the tractor, and each disc having its own hitch connection and the two discs extending in diverging lines rearward from one another. Instead of the disc type plow, other types may be used, such as the flat bottomed share type and deep subsoiling coulters, the manner of connection of the hitch or draft device being desirable regardless of the type of plow because it makes a strong and powerful connection with the plows.

Referring first to what is shown in Figs. 1 and 2 of the drawings the tractor, 10, shown has at the transverse center of the rear axle housing a clevis or draw plate, 11, to which is attached a draw bar, 12, that extends obliquely rearward, said draft bar being roughly Y-shape, the forks being straps, 13, which are respectively bolted to the clevis plate, 11, at opposite sides. At its rear end the draw bar, 12, has an upturned lug, 14, through a hole in which is passed the rear end of a shaft or rod, 15, that extends obliquely forward to a point near one end of the axle housing, 16, and by a half-turn or loop, 17, is carried around the forward half of such housing and thereby the rod, 15, and thus the hitch device is given a simple but powerful bearing against the forward side of the rear axle housing. At the rear side of the axle housing the upper and lower members of the loop are connected by a U-shape bolt, 18, the legs of which above the upper member of the loop are connected by a clip, 19, and nuts, 20, above the clip. The upper member of the loop, 17, is extended rearward to constitute an arm, 21, to the rear end of which is attached an upwardly extending forked arm, 22, to the upper end of which is pivoted a hand lever, 23, which at one end by a link, 24, is connected to an arm or extension of the bar or frame, 25, which supports the two disk plows and which is pivotally connected at its opposite ends by lugs, 26, with the rod or shaft, 15, so that by manipulating the lever, 23, the plows may be raised or lowered. They may be held in a fully raised position so as to clear the ground by catching the hand lever, 23, under a hook, 27, at the upper end of a vertical extension of the clip, 19, the grasping end of the handle, 23, being thus situated at the side of the driver and forward so that he can comfortably and conveniently reach the lever, 23, in manipulating it in the operation of raising and lowering the plows.

The frame or bar, 25, extends parallel with the shaft or rod, 15, and thus extends at an angle or obliquely rearward and inward from the point of connection of the rod, 15, with the outer end of the rear axle housing, 16, and to support each of the disk plows, 28, a bracket arm, 29, is bolted or riveted to the frame bar, 25, and extends at right angles rearwardly therefrom and thus the disk plows are supported obliquely or at an angle to the line of draft of the tractor. To the outermost bracket bar, 29, or to a rearward extension thereof is connected one end of the link, 24, whose other end is connected to the end of the hand lever, 23, on the side of the pivot thereof opposite the hand grasping portion of the lever, 23. When the disc plows are moved to their lowermost position, the hand lever, 23, stands vertical or nearly vertical and the pivotal connection of said lever and the arm, 22, and the pivotal connection between the link, 24, and the hand lever, 23, and between the link, 24, and the bracket arm, 29, aline sufficiently to produce a toggle effect which will hold the plows in their lowermost position but will permit them to yield upwards by the release of the toggle lock when they encounter any unyielding obstruction. The lever, 23, when in its vertical position bears below its pivot in a slot and against a stop 22ª which is also a tension bolt passing across the forks of arm, 22, so that the lever and the plows will be in just the right tension and position to assure the pressure necessary to plow the hardest ground, while allowing a buckling and releasing action should the plows strike anything solid. The weight of the plows is almost sufficient to hold them to give the desired penetration in ordinary ground but it is desirable to supplement such weight by the toggle-like locking action and tension described.

To regulate the depth of penetration of the plows the connection between the lever, 23, and the fulcrum arm is adjustable, as by providing a series of holes, 22ᵇ in the lever with any one of which the pivot bolt may engage.

Referring to the embodiment of my invention shown in Fig. 3 the construction and arrangement in all substantial respects is the same as that illustrated in Figs. 1 and 2 but the draw bar, 130, corresponding to the draw bar, 13, extends directly rearward from the clevis plate, 110, and the single disc plow, 30, at each side of the center line of draft of the tractor extends obliquely rearward and outward so that the two disc plows diverge rearwardly from each other, and the obliquely inclined frame bar, 250, in each case and the pivoting rod or shaft, 150, in each case is shorter than the corresponding parts shown in Figs. 1 and 2. The parts shown in Fig. 3 corresponding to those shown in Figs. 1 and 2 which I have not specifically mentioned are designated with the same reference numerals with the suffix of "0".

In Fig. 4 I illustrate my invention for using horses as the draft means so as to furnish a horse-power riding plow. The plow arrangement shown is that similar to Fig. 3 with two similar outwardly and rearwardly diverging disc plows, 280, the hitch or unit connection in the case of each plow which includes the obliquely extending rod or shaft, 151, being attached at its forward end to an axle, 161, which may be the front axle of a wagon, and at its rear end to an arm or strap, 111, which is bolted to the rear end of a prolongation or extension, 211, of the wagon tongue, 212. There is, of course, a lever, 230, corresponding to the hand lever, 23, of the construction shown in Fig. 1 for raising and lowering the disc plow and a fulcrum arm, 220, for such lever which is a rearward extension of the rod or shaft, 151, and each disc plow is carried by a bar, 252, which is pivotally mounted on the rod or shaft, 251.

In the case of the double disc plow shown in Fig. 1 provision is made for changing the angle of the discs so that they will take more or less land, which consists of several holes, 31, in one of the forks, 13, of the draw bar, 12, which enables the angle of the draw bar to be changed; and for vertical adjustment of the plows for leveling the upturned end or lug, 14, of the draw bar, 12, has several holes, 32, one above the other which permits the angle of the rod or shaft, 15, to be shifted vertically. Neither of these adjustments need be provided in the case of the single disk plow illustrated in Fig. 3.

What I claim is:

1. A tractor-draft connection comprising a draft member that extends obliquely inwardly and rearwardly from the outer end of the rear axle housing, the inner end being further from the axle, and means for connection with the tractor at two points only, one of said points being at the outer end of the axle, and the other at midlength of the axle, the draft upon said draft member being exerted at both of such points.

2. A tractor-draft connection comprising a draft member that extends obliquely inwardly and rearwardly from the outer end of the rear axle housing, the inner end being further from the axle, and means for connection with the tractor at two points only, one of said points being at the outer end of the axle, and the other at midlength of the axle, the draft upon said draft member being exerted at both of such points, said draft member comprising an obliquely extending rod or shaft in rear of the axle, a frame bar pivotally mounted upon said rod or shaft, and a hand lever to rock said frame bar upon said rod or shaft.

3. A tractor-draft connection or hitch comprising a draft member that extends obliquely rearward and inward from the outer end of the rear axle housing and has means for connection with the tractor at the outer end of the axle and also at midlength thereof, the inner end being furthest from the axle in the direction of draft of the tractor, said member comprising a rod or shaft and a frame bar pivotally mounted upon said rod or shaft to rock vertically, said rod or shaft having a rearwardly extending arm and a hand lever pivoted to said arm and connected with said frame.

4. A tractor-draft connection or hitch comprising a rod or shaft having a loop to engage the forward side of the rear axle housing of the tractor, said rod or shaft extending obliquely rearward and inward, means connecting the inner end of said rod or shaft and the rear axle housing at midlength and an implement supporting bar or frame pivotally mounted on said rod or shaft and extending obliquely inward and rearward from the outer end of the axle housing.

5. A draft connection or hitch comprising an implement carrying member that supports the implement in an oblique position with reference to the line of draft, a rod or shaft that extends obliquely rearward and inward with reference to the line of draft, the outer end thereof being furthest forward, said member being pivoted upon said rod or shaft to rock vertically, and means to connect said rod or shaft with a transporting device.

6. A draft connection or hitch comprising an implement carrying member that supports the implement in an oblique position with reference to the line of draft, a rod or shaft that extends obliquely rearward and inward with reference to the line of draft, the outer end thereof being furthest forward, said member being pivoted upon said rod or shaft to rock vertically, and means to connect said rod and shaft with a transporting device, and a lever pivoted to an extension of the forward end of said rod or shaft and connected with said implement supporting member.

In testimony whereof I hereunto affix my signature.

JOHN J. KOGER.